United States Patent [19]

Prucnal et al.

[11] Patent Number: 4,744,623
[45] Date of Patent: May 17, 1988

[54] INTEGRATED FIBER OPTIC COUPLER FOR VHSIC/VLSI INTERCONNECTS

[75] Inventors: Paul R. Prucnal, Bardonia; Eric R. Fossum, Peekskill; Richard M. Osgood, Jr., Chappaqua, all of N.Y.

[73] Assignee: The Trustees of Columbia University in the City of New York, New York, N.Y.

[21] Appl. No.: 879,981

[22] Filed: Jun. 30, 1986

Related U.S. Application Data

[63] Continuation-in-part of Ser. No. 787,910, Oct. 16, 1985, abandoned.

[51] Int. Cl.$^4$ .............................................. G02B 6/36
[52] U.S. Cl. ...................... 350/96.20; 219/121 LJ; 250/227; 350/96.15; 357/30; 357/55; 437/3
[58] Field of Search ............... 29/572, 576 B, 580; 219/121 LJ; 250/227; 350/96.15, 96.20; 357/19, 30, 55

[56] References Cited

U.S. PATENT DOCUMENTS

| | | | |
|---|---|---|---|
| 4,127,862 | 11/1978 | Ilegems et al. | 357/55 |
| 4,152,044 | 5/1979 | Liu | 357/19 |
| 4,167,746 | 9/1979 | Storm | 357/30 |
| 4,217,598 | 8/1980 | d'Auria et al. | 357/19 |
| 4,326,771 | 4/1982 | Henry et al. | 29/580 |
| 4,445,751 | 5/1984 | Divens et al. | 350/96.15 |
| 4,570,173 | 2/1986 | Anthony et al. | 357/55 |
| 4,577,209 | 3/1986 | Forrest et al. | 357/30 |

FOREIGN PATENT DOCUMENTS 89707 7/1981 Japan ............................ 350/96.20

Primary Examiner—William L. Sikes
Assistant Examiner—Frank González
Attorney, Agent, or Firm—John P. White

[57] ABSTRACT

An integrated fiber optic coupler useful for the optical transmission of data from a light source to a detector located on a semiconductor chip which comprises a semiconductor wafer with a cavity etched into a surface, means wthin the cavity for converting light into an electrical signal, an electroconductive metal deposited on the surface of the semiconductor wafer around the opening of the cavity forming an electrical connection between the means for converting light into an electrical signal and circuitry etched into the wafer and an optical fiber inserted into the cavity and affixed to the semiconductor wafer.

21 Claims, 5 Drawing Sheets

INTEGRATED FIBER OPTIC COUPLER FOR VHSIC/VLSI INTERCONNECTS

This invention was made with government support under grant number N66001-85-C-0258 from the Naval Ocean Systems Center, U.S. Department of Defense and grant number DAAG 29-82-K-0080 from the U.S. Department of the Army. The U.S. Government has certain rights in the invention.

This application is a continuation-in-part of U.S. Ser. No. 787,910, filed Oct. 16, 1985, (now abandoned) the contents of which are hereby incorporated by reference into the present application.

BACKGROUND OF THE INVENTION

Within this application several publications are referenced by arabic numerals within parentheses. Full citations for these references may be found at the end of the specification immediately preceding the claims. The disclosures of these publications in their entireties are hereby incorporated by reference into this application in order to more fully describe the state of the art to which this invention pertains.

This invention relates to integrated fiber optic couplers for VHSIC/VLSI interconnects and methods of making the same.

The performance of VHSIC/VLSI circuits is limited by the communication capacity between gates, chips and boards (1). A significant limitation of electronic interconnection is known as the "pinout" problem. Recent advances in circuit technology allow for up to 100,000 gates on a single chip. According to Rent's rule, a circuit with 100,000 gates requires 2,000 interconnections (2). However, the perimeter of a typical 10 mm by 10 mm chip provides space for a maximum of 300 pins, a gross undersupply (3). Stated differently, the minimum allowed pin spacing to avoid signal cross coupling is approximately 100 $\mu$m, whereas Rent's rule implies a required maximum spacing of 20 $\mu$m (2).

Fiber optic interconnects are recognized as a potential solution to the pinout problem and other problems arising from limitations in communication capacity (2-7). The advantages of optical over electronic interconnections include immunity to mutual interference, freedom from capacitive loading and freedom from planar contraints (5). Optical interconnections also have the potential for reconfigurable switching and optically controlled electronic logic (2).

No satisfactory means presently exists of coupling a fiber to a detector on a VLSI chip. Additionally, optical interconnections must achieve a connection spacing of less than 20 $\mu$m to overcome the electrical pinout problem. A 20 $\mu$m interconnection spacing would be difficult to achieve using standard fiber coupling techniques such as silicon V-groove or butt-coupling because the cladding diameter of typical optical fibers is greater than 100 $\mu$m. Furthermore, butt-coupling may be mechanically unstable, provide poor alignment and is not suited for high packing densities. V-groove coupling is not easily aligned with a detector array on a chip, and gives rise to problems associated with multigroove splicing (8).

SUMMARY OF THE INVENTION

The present invention concerns an integrated fiber optic coupler (IFOC) useful for the optical transmission of data from a light source to a detector located on a semiconductor chip. The coupler comprises a semiconductor wafer having a cavity etched into a surface, said cavity having means within it for converting light into an electrical signal. An electroconductive metal is deposited on the surface of the semiconductor wafer around the opening of the cavity, forming an electrical connection between the means for converting light into an electrical signal and the circuitry etched into the semiconductor wafer. An optical fiber is inserted into the cavity and affixed to the wafer.

The semiconductor wafer may be a silicon wafer or a Gallium arsenide wafer. The cavity etched into the semiconductor may be a well having nearly vertical sides and an opening at the surface of the wafer which is slightly larger than the diameter of the end of the optical fiber to be inserted. The geometry and size of the well permits the accurate alignment of the inserted optical fiber with the means for converting light into an electrical signal formed within the well. The well may be etched by an anisotropic process, e.g. by a laser beam.

The means of converting light into an electrical signal may be a p-n junction or a n-p junction. In a preferred embodiment of the invention, the means of converting light into an electrical signal is a reverse biased p-n junction which comprises a p-n junction having a negative voltage applied to the p material.

The electroconductive metal deposited on the surface of the semiconductor wafer around the opening of the cavity may be aluminum and the optical fiber may be affixed to the wafer with epoxy.

In one embodiment of the invention, the cavity in the semiconductor wafer extends to an opening on a second surface of the wafer. A second optical fiber is inserted into the cavity through the opening on the second surface of the wafer and is affixed to the wafer.

According to the present invention, the optical fiber which is inserted into the cavity of the semiconductor wafer may be a single mode optical fiber or a multimode optical fiber. Furthermore, the optical fiber may be heated and uniformly stretched until the diameter of the end of the fiber to be inserted into the cavity is less than the width of the cavity. Alternatively, the cladding of the optical fiber may be chemically etched away until the diameter of the end of the optical fiber which is to be inserted into the cavity is slightly smaller than the width of the cavity. The end of the optical fiber core which is inserted into the cavity may have a tapered diameter.

In a preferred embodiment of the invention, the outer cladding is chemically etched from the end of a single mode optical fiber which is to be inserted into the cavity until the diameter of fiber is less than the width of the cavity. The inserted end of this fiber has tapered diameter, although the diameter of the fiber core remains constant. In a specific embodiment of the invention, the single mode optical fiber has a constant core diameter of about 9 $\mu$m and a total diameter of about 15 $\mu$m at the point where the optical fiber intersects the plane of the surface of the semiconductor chip.

The invention further concerns a method of constructing an IFOC. This method involves etching a deep high aspect well into the substrate of a semiconductor chip with a laser beam and doping the well with a spin-on dopant film. The chip is then heated by a high temperature drive-in process to create a detector capable of converting light into an electrical signal within the well, e.g. a p-n junction or a n-p junction.

An electroconductive metal is thermally evaporated and deposited on the semiconductor chip around the opening of the well to form an electrical connection between the detector and the circuitry etched into a surface of the chip.

An optical fiber is separately heated and uniformly stretched to a diameter less than the width of the well on the semiconductor chip. This fiber is then inserted and affixed to the chip with epoxy.

The present invention enables the provision of an IFOC with an interconnect spacing nearly as small as the size of a single mode waveguide. This interconnect is useful for overcoming the pinout problem and offers the advantages of very high packing density, accurate alignment and mechanical stability. Furthermore, unlike an electrical interconnect, this optical interconnect need not be confined to the perimeter of the chip, but can be located at any point on the surface or the edge of the chip.

DETAILED DESCRIPTION OF THE INVENTION

Figure 1:
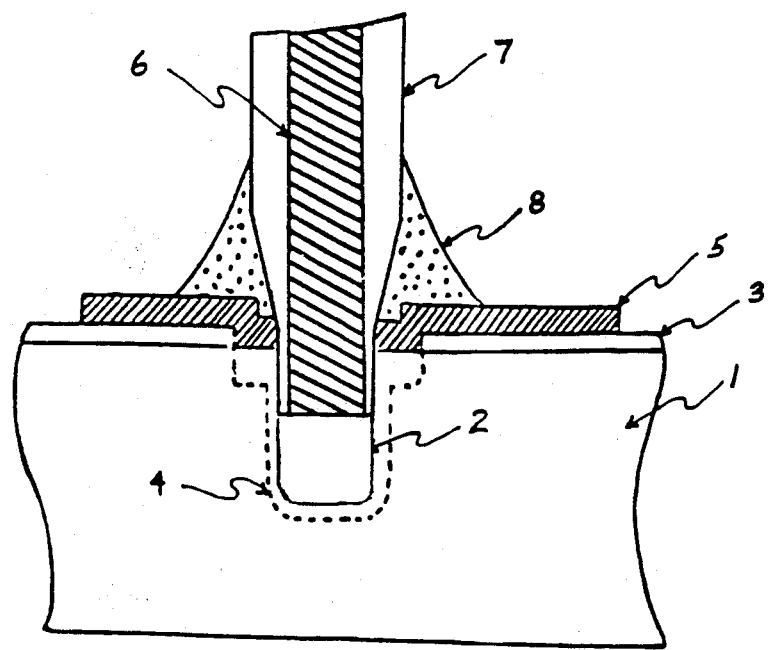
FIG. 1 is a schematic cross-sectioned view of an integrated fiber optic coupler embodying the present invention in a particular form.
Figure 2A:
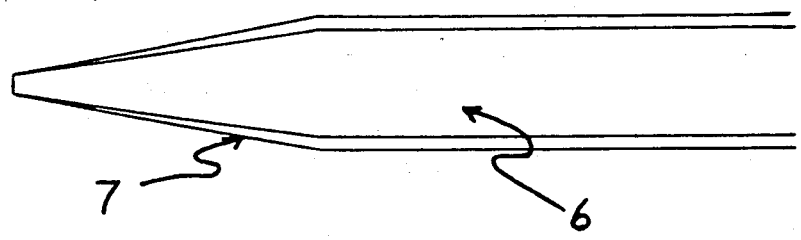
FIG. 2 illustrates two embodiments of multimode optical fibers contemplated by the present invention. (A) Taper made by chemical etching. (B) Taper made by heating and stretching.
Figure 2B:
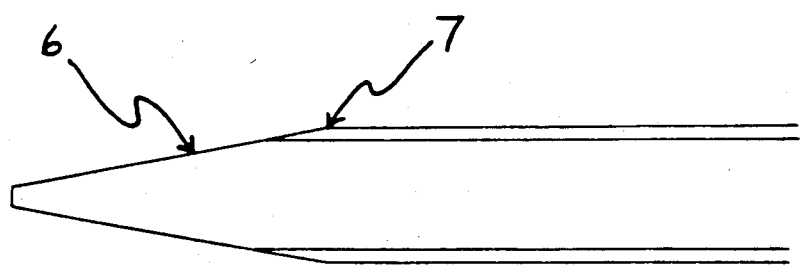

Referring in more particularity to FIGS. 1 and 2, the present invention contemplates an integrated fiber optic coupler (IFOC) which comprises a semiconductor wafer 1 having a deep high aspect well 2 extending from a surface into the substrate. This surface may be layered with silicon dioxide 3 and be suitable for etching into it an integrated circuit. The well 2 may be fabricated as described in (9), using the 257 nm light from a frequency-doubled Argon ion laser to accomplish low temperature light-assisted etching in a 5% aqueous solution of HF. In this process, the hole diameter is controlled to first order by the diameter of the nearly focused beam at the surface of the substrate. A limited variation about this diameter can be effected by changing the beam power.

A detector 4 capable of converting light into an electrical signal is formed within the well 2 by applying to said well 2 a spin-on dopant film followed by a high temperature drive-in process for approximately three hours. Said detector 4 may be a p-n junction or an n-p junction. In a preferred embodiment of the invention, a p-n junction is fabricated within a well etched into a silicon wafer by doping the well with a Boron containing dopant film and heating the wafer for approximately three hours.

For metallization, aluminum 5 is thermally evaporated and delineated using a wet etch. Backside aluminum is also deposited. It should be noted that other metals suitable for electrical connections and known in the art may also be used.

An optical fiber may be separately stretched and inserted into the detector cavity. A Corning dBF graded index fiber, with 85 $\mu$m core diameter and 125 $\mu$m cladding diameter may be used for the optical interconnection. At $\lambda = 0.633$ $\mu$m, the cladding index of refraction is $n_c = 1.457$ and the core center index of refraction is $n_0 = 1.486$, corresponding to a numerical aperture of 0.26. The attenuation is 4 dB/km at $\lambda = 0.850$ $\mu$m. The fiber is suspended vertically with a weight of a few grams on its end and passed briefly through a 2000 volt electric discharge arc, causing the fiber to melt and stretch uniformly. The tip of the stretched fiber is examined under an optical microscope at 1000× magnification and an outer cladding 7 diameter of 5 $\mu$m is recorded. Since the ratio of core to cladding diameters is maintained after stretching the fiber, the final core 6 diameter is 3.4 $\mu$m.

As an alternative to heating and stretching the optical to reduce its diameter, the outer cladding of the fiber may be chemically etched away using a saturated solution of HF.

In order to facilitate mechanical insertion of the optical fiber into the detector well, which also acts as a seat for the fiber, the fiber is first pulled through a glass capillary tube until only the tip protrudes. The capillary tube is then mounted on a machined metal holder, which in turn is connected to a micro-manipulator at an adjustable tilt angle to facilitate the fiber insertion. The silicon chip containing the detector cavity is mounted beneath the 8× microscope objective, on the x-y stage of the probe station. While viewing through the zoom microscope, the portion of the fiber tip is manipulated manually and inserted into the detector cavity. A preferred embodiment of the invention comprises an optical fiber with a constant core diameter rather than a tapered core.

The optical fiber may be affixed to the silicon wafer by glueing the outside cladding of the fiber of the aluminum layer 5 with epoxy 8.

Figure 4:
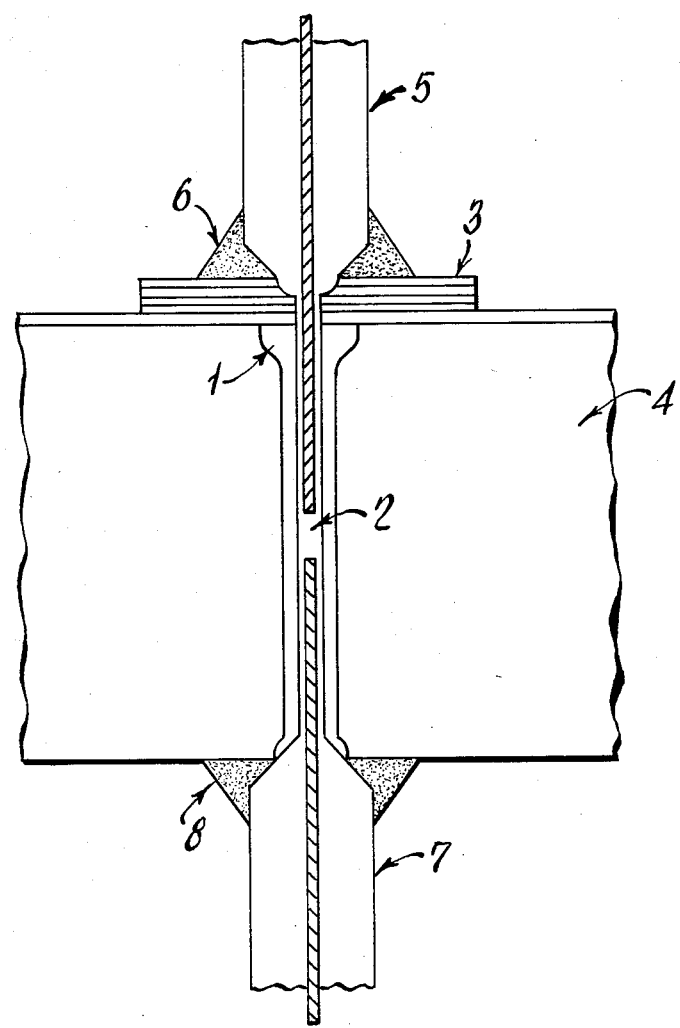
FIG. 4 is a schematic cross-sectioned view of an integrated fiber optic coupler embodying the present invention in the form of a low-loss optical tap.

The present invention further provides a low-loss optical tap which comprises a deep high aspect well etched into the semiconductor wafer so as to extend from a first surface of the wafer to a second surface of the wafer. Referring in more particularity to FIG. 4, a detector 1 is fabricated within the well 2 and aluminum 3 is deposited around the opening of the well on a first surface of the wafer 4. An input optical fiber 5 is inserted into the well through the opening on said first surface of the wafer and is affixed to the wafer with epoxy 6 as described above. Additionally, an output optical fiber 7, capable of collecting light emitted by the input optical fiber which is not absorbed by the detector, is inserted into the well through the opening on a second surface of the wafer. This fiber is also affixed to the wafer with epoxy 8 as described above.

This IFOC is useful for connecting semiconductor chips, e.g. receivers, in series.

Experimental Results

Figure 3:
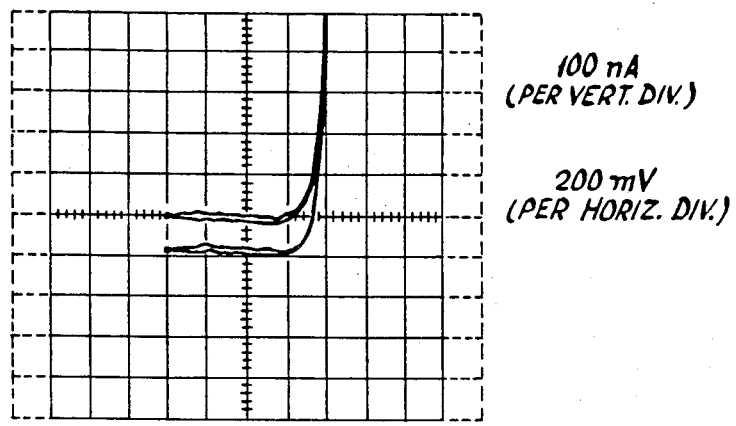
FIG. 3 shows the I-V characteristic of an integrated fiber optic coupler embodying the present invention in a particular form. The upper curve represents no illumination and the lower curve represents illumination from the tapered fiber end.

The performance of the completed optical interconnect may be measured by injecting light into the fiber and measuring the photocurrent generated on the silicon chip. By this method, the light from a 25 mW cW HeNe laser, operating at $\lambda = 0.63$ $\mu$m, is focused on the cleaved untapered fiber end using a 5× microscope objective rated at a numerical aperture of 0.13. The output from the tapered end of a heated and stretched Corning dBF graded index fiber was measured to be 2.4 µW, using a NRC Model 815 Si photodetector. After insertion of the tapered end into the hole, using a curve tracer, the IV characteristic of the photodiode was measured (see FIG. 3). The downward shift of the IV characteristic under illumination corresponds to a photon-generated current of 100 nA for an optical power of 2.4 µW inside the hole. The responsivity of the photodiode (in the hole) is therefore 0.40 A/W.

Discussion

The loss between the laser and the fiber output is attributed largely to improper alignment of the laser with the fiber. In a subsequent measurement, 1.33 mW is coupled from the 25 mW laser source into the fiber and an output power of 1.18 mW is recorded at the tapered fiber output.

Additional loss in the fiber is attributed to the small core size of the tapered fiber output. If all the modes in the fiber are uniformly excited, then the total integrated power propagating in the fiber should decrease as the square of the core radius. In this case the tapering of the fiber should result in a loss of at least 99% of the propagating modes. On the other hand, according to Marcatili (10), a lossless taper is possible in principle, if the correct geometry is used.

Although the tapered fiber is a convenient method to match the fiber to the hole size, theoretically less loss can be achieved using a single mode fiber with the core diameter constant (11). It is also desirable at least in some instances to chemically etch a single mode fiber cladding to a small diameter in order to provide high packing density. Thus, the well may be chemically etched slightly larger in width than a single mode fiber core (approximately 9 µm). The minimum thickness cladding (perhaps 3 µm) needed for isolation will surrounds the core, bringing the total diameter of the coupler to about 15 µm.

The net responsivity measured of the detector is 41 mA/W, corresponding to a quantum efficiency of approximately 7.5%. Such efficiency is reasonable for a non-optimized p-n junction diode. With improvements in processing techniques for detector fabrication and single-mode fiber etching, it is expected that higher efficiency will be obtained. Though the technique described here has been experimentally tested with Si circuits, the same technique can be applied to the ultra-high speed circuitry made possible by using GaAs.

References

1. R. W. Keyes, "Physical limits in digital electronics, "Proc. IEEE, 63, 740–767 (1975).
2. J. W. Goodman, F. I. Leonberger, S. Y. Kung, and R. A. Athale, "Optical interconnections for VLSI systems," Proc. IEEE, 72, 850–866 (1984).
3. A. Husain, "Optical interconnect of digital integrated circuits and systems," Optical Interfaces for Digital Circuits and Systems, Raymond A. Milano Editor, Proc. SPIE 466, 10–20 (1984).
4. A. Husain "The optical interconnect: micro circuit problem solver," Phonetics Spectra, 57–60 (August 1984).
5. J. W. Goodman, "Optical interconnections in Microelectronics," Opt. Eng. Reports, 5–12 (Nov. 1984).
6. J.vA. Neff, "Optical computing," Opt. Eng. 24, 001 (1985).
7. J. A. Neff, "An interview with John Neff on optics research and development," Opt. Eng. Reports, 1–3 (April 1985).
8. Y. Ando, I. Nishi, "Spring-retentive V-groove splice for joining groups of optical fibers," Appl. Opt. 21, 2689–2692 (August 1982).
9. D. V. Podlesnik, H. H. Gilgen, and R. M. Osgood, Jr. "Deep-ultraviolet induced wet etching of GaAs," Appl. Phys. Lett. 45, (1984).
10. E. A. J. Marcatili, "Dielectric tapers with curved axes and no loss," IEEE J. Quantum Electron. QE-21, 307–314 (1985).
11. A. C. G. Nutt, J. P. G. Bristow, A. McDonach, and P. J. R. Laybourn, "Fiber-to-waveguide coupling using ion-milled grooves in lighium niobate at 1.3-m wavelength," Opt. Lett. 9, 463.

What we claim is:

1. An integrated fiber optic coupler useful for optically transmitting data from a light source to a detector located on a semiconductor chip capable of having circuitry etched therein, which comprises:
   a. a semiconductor wafer having a cavity etched into a surface;
   b. means within the cavity for converting light into an electrical signal;
   c. an electroconductive metal deposited on the surface of the semiconductor wafer around the opening of the cavity forming an electrical connection between the means for converting light into an electrical signal and circuitry etched into the semiconductor wafer; and
   d. a single-mode optical fiber inserted into the cavity and affixed to the semiconductor wafer.

2. An integrated fiber optic coupler as defined in claim 1, wherein the semiconductor wafer is a silicon wafer.

3. An integrated fiber optic coupler as defined in claim 1, wherein the semiconductor wafer is a Gallium arsenide wafer.

4. An integrated fiber optic coupler as defined in claim 1, wherein the cavity on the surface of the semiconductor wafer is a well with vertical sides, the width at the surface of the wafer being larger than the diameter of the inserted section of the optical fiber.

5. An integrated fiber optic coupler as defined in claim 1, wherein the cavity on the surface of the semiconductor wafer is etched by an anisotropic process.

6. An integrated fiber optic coupler as defined in claim 5, wherein the cavity is etched with a laser beam.

7. An integrated fiber optic coupler as defined in claim 1, wherein the means of converting light into an electrical signal is a p-n junction.

8. An integrated fiber optic coupler as defined in claim 7, wherein the p-n junction is a reverse biased p-n junction.

9. An integrated fiber optic coupler as defined in claim 1, wherein the means of converting light into an electrical signal is a n-p junction.

10. An integrated fiber optic coupler as defined in claim 1, wherein the electroconductive metal deposited on the surface of the semiconductor wafer around the opening of the cavity is aluminum.

11. An integrated fiber optic coupler as defined in claim 1, wherein the optical fiber is affixed to the semiconductor wafer with epoxy.

12. An integrated fiber optic coupler as defined in claim 1, wherein the optical fiber is heated and uniformly stretched until the diameter of the end of the fiber to be inserted into the cavity is less than the width of the cavity at the surface of the wafer.

13. An integrated fiber optic coupler as defined in claim 12, wherein the end of the optical fiber which is inserted into the cavity has a tapered diameter.

14. An integrated fiber optic coupler as defined in claim 1, wherein the cladding of the optical fiber is chemically etched away until the diameter of the end of the optical fiber which is to be inserted into the cavity is smaller than the width of the cavity at the surface of the wafer.

15. An integrated fiber optic coupler as defined in claim 14, wherein the end of the optical fiber which is inserted into the cavity has a tapered diameter.

16. An integrated fiber optic coupler useful for optically transmitting data from a light source to a detector located on a semiconductor chip capable of having circuitry etched therein, which comprises:
   a. a semiconductor wafer having a cavity etched into a first surface thereof and extending to an opening of a second surface thereof;
   b. means within the cavity for converting light into an electrical signal;
   c. an electroconductive metal deposited on the first surface of the semiconductor wafer around the opening of the cavity forming an electrical connection between the means for converting light into an electrical signal and circuitry etched into the semiconductor wafer;
   d. a first optical fiber inserted into the cavity from the first surface of the semiconductor wafer and affixed to the semiconductor wafer; and
   e. a second optical fiber inserted into the cavity from the second surface of the semiconductor wafer and affixed to the semiconductor wafer.

17. An integrated fiber optic coupler as defined in claim 16, wherein each optical fiber is a single mode optical fiber.

18. An integrated fiber optic coupler as defined in claim 16, wherein each optical fiber is a multimode optical fiber.

19. An integrated fiber optic coupler as defined in claim 17, wherein the cladding of each optical fiber is chemically etched away until the diameter of the end of the optical fiber which is to be inserted into the cavity is smaller than the width of the cavity at the surface of the wafer, the inserted end of the fiber has a tapered diameter and the fiber core has a constant diameter.

20. An integrated fiber optic coupler as defined in claim 19, wherein each optical fiber has a constant core diameter of about 9 $\mu$m and a total diameter of about 15 $\mu$m at the point where the optical fiber intersects the plane of the surface of the semiconductor chip.

21. A method of constructing an integrated fiber optic coupler which comprises:
   a. etching a deep high aspect well into the substrate of a semiconductor chip with a laser beam;
   b. doping the deep high aspect well with a spinon dopant film;
   c. heating the chip by a high temperature drive-in process to create a detector capable of converting light into an electrical signal within the deep high aspect well;
   d. thermally evaporating and depositing by wet etching an electroconductive metal on the semiconductor chip around the opening of the well to form an electrical connection between the detector and the circuitry etched into a surface of the chip;
   e. separately heating and uniformly stretching an optical fiber;
   f. inserting the tapered end of the uniformly stretched single mode optical fiber into the deep high aspect well; and
   g. affixing the optical fiber to the semiconductor chip with epoxy.

* * * * *